United States Patent
Terrab et al.

(10) Patent No.: US 11,632,487 B1
(45) Date of Patent: Apr. 18, 2023

(54) SECONDARY COLOR UNIFORMITY COMPENSATION MECHANISM

(71) Applicants: Soraya Terrab, Boulder, CO (US); Mikel Stanich, Boulder, CO (US); Ziling Zhang, Boulder, CO (US); Nikita Gurudath, Boulder, CO (US); Walter F. Kailey, Boulder, CO (US); James Chauvin, Boulder, CO (US)

(72) Inventors: Soraya Terrab, Boulder, CO (US); Mikel Stanich, Boulder, CO (US); Ziling Zhang, Boulder, CO (US); Nikita Gurudath, Boulder, CO (US); Walter F. Kailey, Boulder, CO (US); James Chauvin, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/684,257

(22) Filed: Mar. 1, 2022

(51) Int. Cl.
   *H04N 1/60* (2006.01)
   *H04N 1/401* (2006.01)
   (Continued)

(52) U.S. Cl.
   CPC ....... *H04N 1/4015* (2013.01); *H04N 1/00034* (2013.01); *H04N 1/4057* (2013.01); *H04N 1/603* (2013.01)

(58) Field of Classification Search
   CPC .......................... H04N 1/00034; H04N 1/603
   See application file for complete search history.

(56) References Cited

U.S. PATENT DOCUMENTS

| | | |
|---|---|---|
| 6,270,187 B1 | 8/2001 | Murcia et al. |
| 7,024,126 B2 | 4/2006 | Kellie et al. |

(Continued)

FOREIGN PATENT DOCUMENTS

| | | | |
|---|---|---|---|
| EP | 1157840 B1 | 7/2007 | |
| EP | 4052916 A1 * | 9/2022 | ............ B41J 2/0451 |

(Continued)

OTHER PUBLICATIONS

Hansen et al., "High-Throughput Printing via Microvascular Multinozzle Arrays", Advanced Materials, 25(1), pp. 96-102.

(Continued)

*Primary Examiner* — Ted W Barnes
(74) *Attorney, Agent, or Firm* — Jaffery Watson Mendonsa & Hamilton LLP

(57) ABSTRACT

A printing system is disclosed. The printing system includes at least one physical memory device to store calibration logic and one or more processors coupled with the at least one physical memory device to execute the calibration logic to perform uniformity compensation, including receiving print image measurement data corresponding to primary color markings and secondary color markings printed by pel forming elements, wherein each of the pel forming elements is associated with one of a plurality of primary colors, generating a first set of transfer functions, wherein the first set of transfer functions include a transfer function for each of the pel forming elements associated with a primary color, generating a second set of transfer functions, wherein the second set of transfer functions include transfer functions for each of the pel forming elements associated with a plurality of secondary colors and generating a set of uniformity compensated transfer functions, wherein the set of uniformity compensated transfer functions include a transfer function for each of the pel forming elements based on the first set of transfer functions and the corresponding second set of transfer functions.

20 Claims, 10 Drawing Sheets

(51) Int. Cl.
  *H04N 1/405* (2006.01)
  *H04N 1/00* (2006.01)

(56) References Cited

U.S. PATENT DOCUMENTS

| | | | |
|---|---|---|---|
| 8,235,490 B2 | 8/2012 | Chandu et al. | |
| 8,322,811 B2 * | 12/2012 | Chandu | H04N 1/4078 347/41 |
| 8,542,418 B2 | 9/2013 | Chandu et al. | |
| 8,573,731 B2 * | 11/2013 | Bastani | B41J 2/2146 347/41 |
| 8,699,103 B2 | 4/2014 | Mestha et al. | |
| 8,967,757 B2 | 3/2015 | Bastani et al. | |
| 9,621,762 B2 | 4/2017 | Chandu et al. | |
| 9,661,154 B1 | 5/2017 | Stanich et al. | |
| 9,785,873 B2 | 10/2017 | Stanich et al. | |
| 9,914,309 B2 | 3/2018 | Billow et al. | |
| 10,082,990 B2 | 9/2018 | Martin et al. | |
| 10,488,846 B2 | 11/2019 | Donovan | |
| 10,549,523 B2 | 2/2020 | Stanich | |
| 2005/0099446 A1 * | 5/2005 | Mizes | B41J 29/393 347/19 |
| 2005/0243340 A1 | 11/2005 | Tai et al. | |
| 2006/0072160 A1 | 4/2006 | Yamazaki | |
| 2012/0050755 A1 | 3/2012 | Chandu | |
| 2013/0021400 A1 | 1/2013 | Tamagawa | |
| 2013/0176600 A1 | 7/2013 | Chandu | |
| 2014/0313255 A1 | 10/2014 | Ukishima | |
| 2016/0052318 A1 | 2/2016 | Humet Pous | |
| 2016/0100079 A1 | 4/2016 | Gerrits | |
| 2017/0236041 A1 * | 8/2017 | Stanich | G06K 15/1881 358/1.9 |
| 2018/0008995 A1 | 1/2018 | Baker et al. | |
| 2018/0022131 A1 * | 1/2018 | Klinger | H04N 1/6041 347/14 |
| 2018/0234582 A1 * | 8/2018 | Stanich | H04N 1/00037 |
| 2018/0236776 A1 * | 8/2018 | Stanich | G06K 15/027 |
| 2019/0389227 A1 * | 12/2019 | Stanich | G06K 15/105 |
| 2020/0274991 A1 * | 8/2020 | Stanich | H04N 1/6038 |
| 2022/0288945 A1 * | 9/2022 | Kailey | H04N 1/4015 |

FOREIGN PATENT DOCUMENTS

| | | |
|---|---|---|
| JP | 2018133801 A | 8/2018 |
| WO | 2008059264 A1 | 5/2008 |

OTHER PUBLICATIONS

Vantram, S. R. (2014). Fully Automated Calibration Procedure to Compensate Print Non-uniformities Incurred in Fixed Print-head Array Structures. Retrieved from https://jp.ricoh.com/-/Media/Ricoh/Sites/jp_ricoh/technology/techreport/39/pdf/RTR39a18.pdf See highlighted sections.

Kailey et al., U.S. Appl. No. 17/194,133 entitled, "Color Uniformity Compensation Mechanism" filed Mar. 5, 2021, 96 pages.

Stanich et al., U.S. Appl. No. 17/194,125 entitled, "Secondary Color Uniformity Compensation Mechanism" filed Mar. 5, 2021, 96 pages.

Kailey et al., U.S. Appl. No. 17/194,103 entitled, "Iterative uniformity correction for primary, secondary and intermediate color combinations" filed Mar. 5, 2021, 95 pages.

Stanich et al., U.S. Appl. No. 17/194,092 entitled, "Secondary Color Uniformity Compensation Mechanism" filed Mar. 5, 2021, 87 pages.

* cited by examiner

SECONDARY COLOR UNIFORMITY COMPENSATION MECHANISM

FIELD OF THE INVENTION

The invention relates to the field of image reproduction, and in particular, to uniformity correction.

BACKGROUND

When correcting cross-web spatial non-uniformity of a print engine with multiple fixed print heads, relatively large non-uniformities may occur at the junction between the print heads and within a printhead. However, correction of each print head nozzle using interpolated reflectance measurements does not fix this problem since the correction of each nozzle affects the reflectance of nearby locations.

Furthermore, creating uniformity compensation based on measurements of Cyan, Magenta and Yellow (CMY) primary colors can generate suboptimal results when printing using secondary colors, Red, Green or Blue (RGB). Secondary colors are produced by a combination of the primary colors. In some cases, acceptable variations in uniformity for each primary color will produce uniformity that is not acceptable when printing a secondary color.

Accordingly, a mechanism to perform nozzle uniformity compensation based on secondary colors is desired.

SUMMARY

In one embodiment, a printing system is disclosed. The printing system includes at least one physical memory device to store calibration logic and one or more processors coupled with at least one physical memory device to execute the calibration logic to perform uniformity compensation, including receiving print image measurement data corresponding to primary color markings and secondary color markings printed by pel forming elements, wherein each of the pel forming elements is associated with one of a plurality of primary colors, generating a first set of transfer functions, wherein the first set of transfer functions include a transfer function for each of the pel forming elements associated with a primary color, generating a second set of transfer functions, wherein the second set of transfer functions include transfer functions for each of the pel forming elements associated with a plurality of secondary colors and generating a set of uniformity compensated transfer functions, wherein the set of uniformity compensated transfer functions include a transfer function for each of the pel forming elements based on the first set of transfer functions and the corresponding second set of transfer functions.

BRIEF DESCRIPTION OF THE DRAWINGS

A better understanding of the present invention can be obtained from the following detailed description in conjunction with the following drawings, in which.

DETAILED DESCRIPTION

A secondary color uniformity compensation mechanism is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
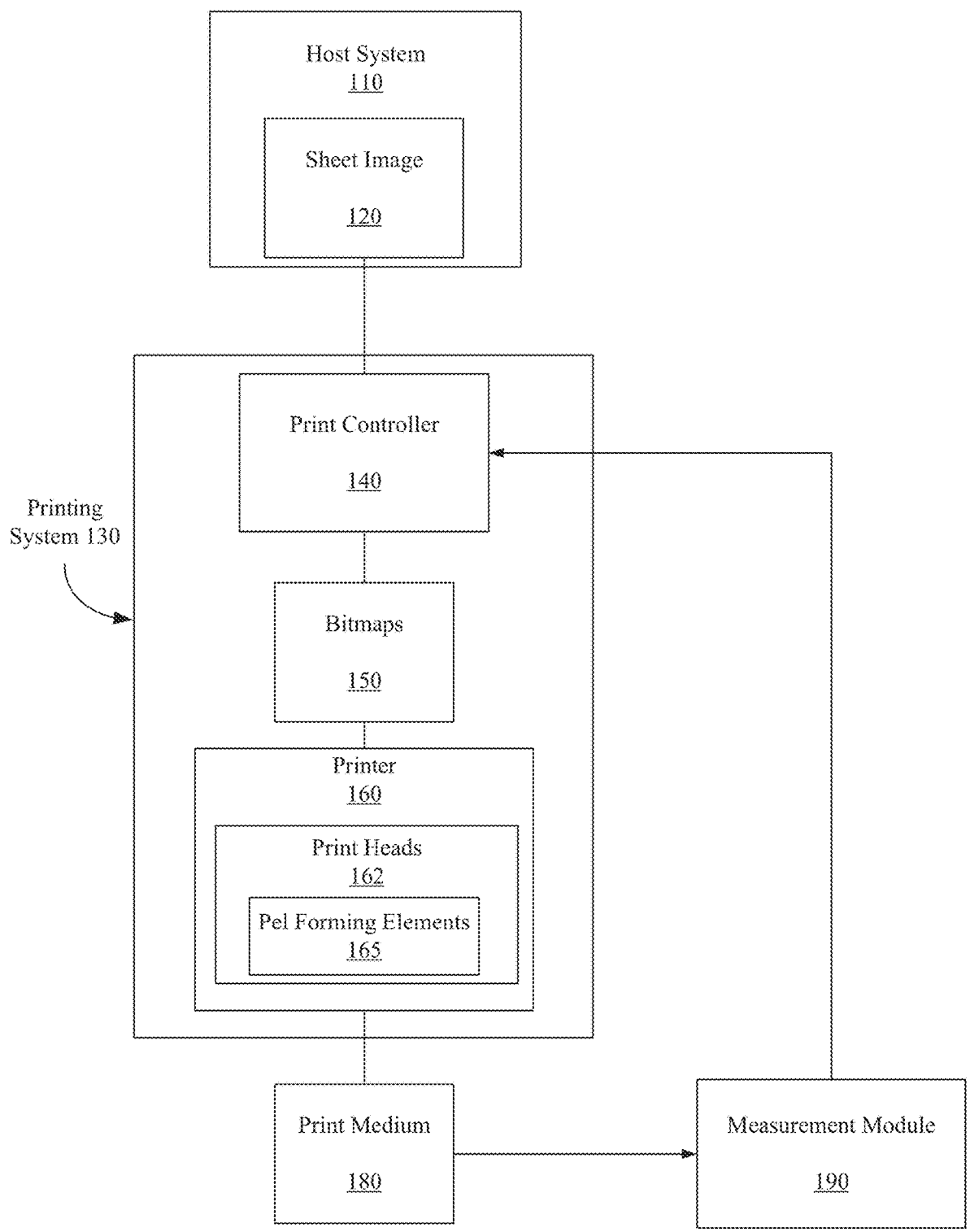
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., print engine). Print medium 180 may include paper, card stock, paper board, corrugated fiberboard, film, plastic, synthetic, textile, glass, composite or any other tangible medium suitable for printing. The format of print medium 180 may be continuous form or cut sheet or any other format suitable for printing. Printer 160 may be an ink jet, electrophotographic or another suitable printer type.

In one embodiment, printer 160 comprises one or more print heads 162, each including one or more pel forming elements 165 that directly or indirectly (e.g., by transfer of marking material through an intermediary) form the representation of picture elements (pels) on the print medium 180 with marking material applied to the print medium. In an ink jet printer, the pel forming element 165 is a tangible device that ejects the ink onto the print medium 180 (e.g., an ink jet nozzle) and, in an electro-photographic (EP) printer the pel forming element may be a tangible device that determines the location of toner particles printed on the print medium (e.g., an EP exposure LED or an EP exposure laser). The pel forming elements may be grouped onto one or more printheads. The pel forming elements 165 may be stationary (e.g., as part of a stationary printhead) or moving (e.g., as part of a printhead that moves across the print medium 180) as a matter of design choice. The pel forming elements 165 may be assigned to one of one or more color planes that correspond to types of marking materials (e.g., Cyan, Magenta, Yellow, and blacK (CMYK)). These types of marking materials may be referred to as primary colors.

In a further embodiment, printer 160 is a multi-pass printer (e.g., dual pass, 3 pass, 4 pass, etc.) wherein multiple sets of pel forming elements 165 print the same region of the print image on the print medium 180. The set of pel forming elements 165 may be located on the same physical structure (e.g., an array of nozzles on an ink jet print head) or separate physical structures. The resulting print medium 180 may be printed in color and/or in any of a number of gray shades, including black and white (e.g., Cyan, Magenta, Yellow, and blacK, (CMYK) and secondary colors (e.g., Red, Green and Blue), obtained using a combination of two primary colors). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for transmission. Bitmap 150 may be a halftoned bitmap (e.g., a calibrated halftone bit map generated from calibrated halftones, or uncalibrated halftone bit map generated from uncalibrated halftones) for printing to the print medium 180. The printing system 130 may be a high-speed printer operable to print relatively high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120. Although shown as a component of printing system 130, other embodiments may feature printer 160 as an independent device communicably coupled to print controller 140.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. In one embodiment, measurement module 190 is implemented as part of a calibration system to obtain measurements of the printed medium 180. The measured results are communicated to print controller 140 to be used in the calibration process. The measurement system may be a stand-alone process or be integrated into the printing system 130.

According to one embodiment, measurement module 190 may be a sensor to take optical measurements of printed images on print medium 180. Measurement module 190 may generate and transmit measurement data 222. Measurement data 222 may be OD (e.g., optical density) and/or perceptual lightness (e.g., L* in the CIELAB color space L*a*b*) data corresponding to a printed image. In one embodiment, measurement module 190 may comprise one or more sensors that each or in total take measurements for printed markings produced for some or all pel forming elements 165.

In another embodiment, measurement module 190 may be a camera system, in-line scanner, densitometer or spectrophotometer. In a further embodiment, measurement data 222 may include a map information to correlate portions of the measurement data 222 (e.g., OD data) to the corresponding pel forming elements 165 that contributed to the portions of the measurement data 222. In another embodiment, the print instructions for a test pattern (e.g., step chart) provide the correlation of the portions of the measurement data to the corresponding pel forming elements that contributed to the portions of the measurement data 222.

Figure 2:
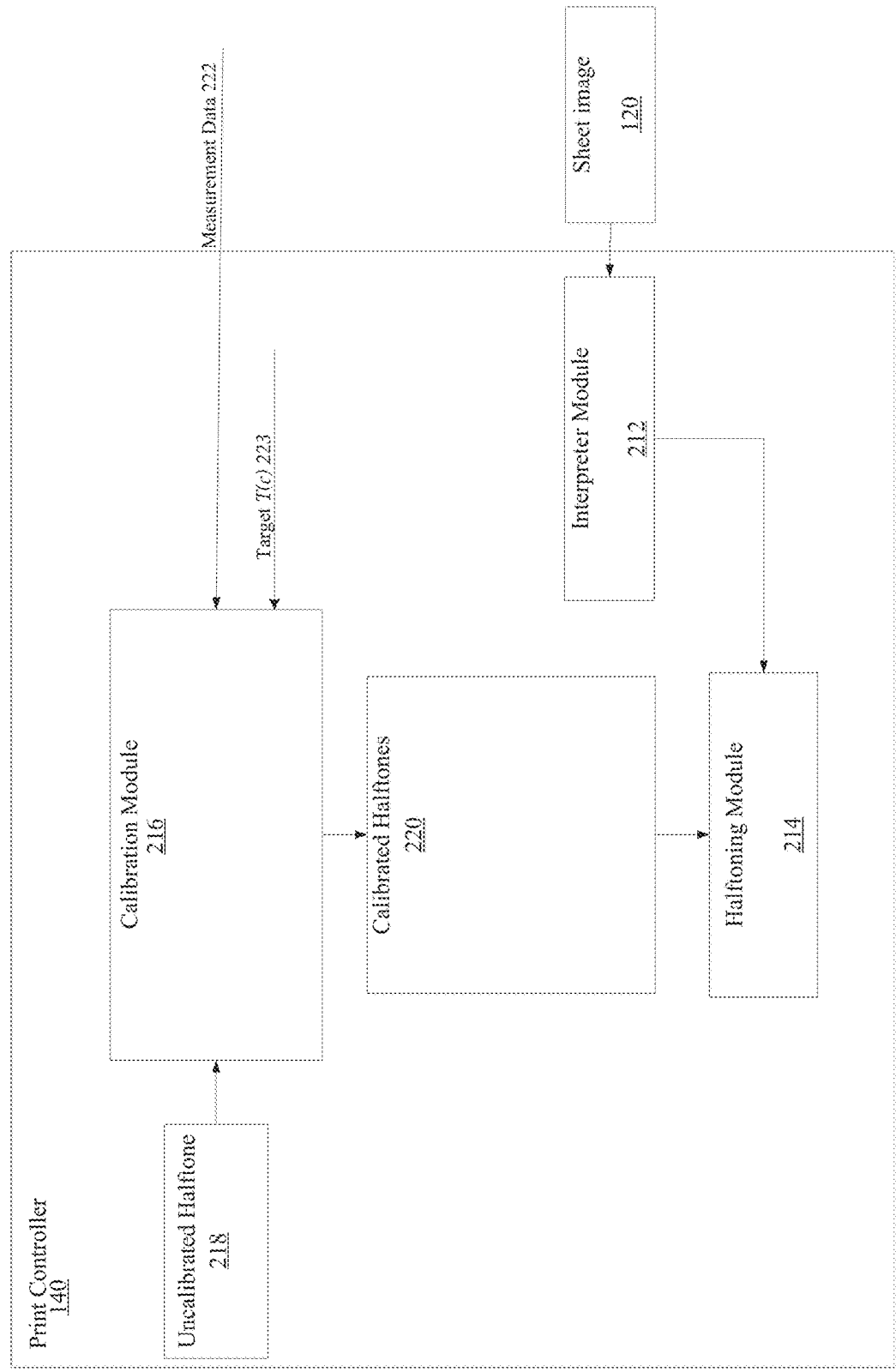
FIG. 2 is a block diagram of one embodiment of a print controller.

FIG. 2 is a block diagram illustrating one embodiment of a print controller 140. The print controller 140, in its generalized form, includes an interpreter module 212, a halftoning module 214, and a calibration module 216. These separate components may represent hardware used to implement the print controller 140. Alternatively, or additionally, the separate components may represent logical blocks implemented by executing software instructions in a processor of the printer controller 140.

The interpreter module 212 is operable to interpret, render, rasterize, or otherwise convert images (e.g., raw sheetside images such as sheet image 120) of a print job into sheetside bitmaps. The sheetside bitmaps generated by the interpreter module 212 for each primary color are each a 2-dimensional array of pels representing an image of the print job (i.e., a Continuous Tone Image (CTI)), also referred to as full sheetside bitmaps. The 2-dimensional pel arrays are considered "full" sheetside bitmaps because the bitmaps include the entire set of pels for the image. The interpreter module 212 is operable to interpret or render multiple raw sheetsides concurrently so that the rate of rendering substantially matches the rate of imaging of production print engines.

Halftoning module 214 is operable to represent the sheetside bitmaps as halftone patterns of ink. For example, halftoning module 214 may convert the pels (also known as pixels) to halftone patterns of CMYK ink for application to the paper. A halftone design may comprise a pre-defined mapping of input pel gray levels to output drop sizes based on pel location.

In one embodiment, the halftone design may include a finite set of transition thresholds between a finite collection of successively larger drop sizes, beginning with zero and ending with a maximum drop size (e.g., threshold arrays such as single bit threshold arrays or multibit threshold arrays). In another embodiment, the halftone design may include a three-dimensional look-up table with all included gray level values.

In a further embodiment, halftoning module 214 performs the multi-bit halftoning using the halftone design consisting of a set of threshold values for each pel in the sheetside bitmap, where there is one threshold for each non-zero ink drop size. The pel is halftoned with the drop size corresponding to threshold values for that pel. This set of thresholds for a collection of pels is referred to as a multi-bit threshold array (MTA).

Multi-bit halftoning is a halftone screening operation in which the final result is a selection of a specific drop size available from an entire set of drop sizes that the print engine is capable of employing for printing. Drop size selection based on the contone value of a single pel is referred to as "Point Operation" halftoning. The drop size selection is based on the pel values in the sheetside bitmap. This contrasts with "Neighborhood Operation" halftoning, where multiple pels in the vicinity of the pel being printed are used to determine the drop size. Examples of neighborhood operation halftoning include the well-known error diffusion method.

Multi-bit halftoning is an extension of binary halftoning, where binary halftoning may use a single threshold array combined with a logical operation to decide if a drop is printed based on the contone level for a pel. Binary halftoning uses one non-zero drop size plus a zero drop size (i.e., a drop size of none where no ink is ejected). Multi-bit halftoning extends the binary threshold array concept to more than one non-zero drop size.

Multi-bit halftoning may use multiple threshold arrays (i.e., multi-bit threshold arrays), one threshold array for each non-zero drop size. The point operation logic is also extended to a set of greater than and less than or equal to operations to determine the drop size by comparing the threshold and image contone data for each pel. Multi-bit defines a power of two set of drop sizes (e.g., two-bit halftone designs have four total drops, including a zero drop size). While power of two may be employed to define the number of drops, systems not following this such as a three total drop system may be used and are still considered multi-bit.

For multi-bit halftones, the MTA is a three-dimensional array including one two-dimensional array for each drop size transition. Thus an MTA includes a set of two-dimensional arrays of thresholds for transition between drop sizes: plane one provides the threshold for the Large output level, while plane 2 and plane 3 provide thresholds for the Medium and Small output levels respectively for a system having three drop sizes not including zero drop size (none or off). In other embodiments, different one-to-one relationship may be used since the correspondence between plane numbers and drop sizes is arbitrary.

To use these threshold arrays for halftoning, in the case where the threshold arrays are smaller than the sheetside map, each multibit threshold array is tiled across contone image data provided by the sheetside bitmap, which provides a set of threshold values for each pel in the sheetside bitmap. The contone image data (e.g., gray level data) is logically compared to the threshold data on a pel basis. In the case of Large drops, they are produced by the halftoning when the image contone data is greater than the respective large threshold values in plane 1.

Medium drops are produced when the image data is greater than the medium drop plane 2 thresholds and also the image data is less than or equal to the large drop thresholds in plane 1. Small drops are produced when the image data is greater than the small drop thresholds in plane 3 and also the image data is less than or equal to the medium drop thresholds in plane 2.

Finally, the off/none drop size occurs for cases when the contone values is less than or equal to the small drop thresholds in plane 3. In this embodiment of a two-bit multibit printing system, this set of four logical equations, used with thresholds from each plane of the multibit threshold array permit each printing drop size to be defined based on the contone values.

In other embodiments, the number of planes of threshold data can be extended to handle any number of drop sizes. The data from these two-dimensional arrays may be segmented into separate memory regions and stored in any convenient order. For example, the thresholds for each drop size transition may be stored contiguously in memory, and it is often advantageous to do so.

In further embodiments, calibration module 216 may perform a calibration process on an un-calibrated halftone 218 received at print controller 140 to generate one or more calibrated halftones 220 (e.g., uniformity compensated halftones). Calibrated halftones 220 are then received at halftoning module 214 along with the sheetside bitmap. In one embodiment, an un-calibrated halftone 218 represents a reference halftone design that is modified to create the calibrated halftones. In such an embodiment, measurements of the system response (e.g., measurement data 222) are received via measurement module 190 using the un-calibrated halftone 218 for printing.

In other embodiments, calibration module 216 performs a process to achieve uniformity compensation using transfer functions. In such an embodiment, calibration module 216 receives print image measurement data corresponding to primary color markings and secondary color markings printed by pel forming elements 165, generates a first set of transfer functions including a transfer function for each of the pel forming elements 165 associated with a primary color, generates a second set of transfer functions including transfer functions for each of the pel forming elements 165 associated with a plurality of secondary colors and generates a set of uniformity compensated transfer functions (e.g., calibrated transfer functions), wherein the set of uniformity compensated transfer functions include a transfer function for each of the pel forming elements 165 based on the first set of transfer functions and a plurality of the corresponding second set of transfer functions.

In a further embodiment, each of the pel forming elements is associated with one of a plurality of primary colors. As used herein, uniformity compensation is defined as a calibration to compensate for measured response differences, by a pel forming element 165 (e.g., print head nozzle) in order to achieve a target response.

In further embodiments, calibration module 216 may generate uniformity compensated halftones by using uniformity compensated transfer functions to generate uniformity compensated inverse transfer functions (e.g., calibrated inverse transfer functions) and applying the inverse transfer functions to the un-calibrated halftone 218 to generate a uniformity compensated halftone design, as will be discussed in more detail below.

Figure 3:
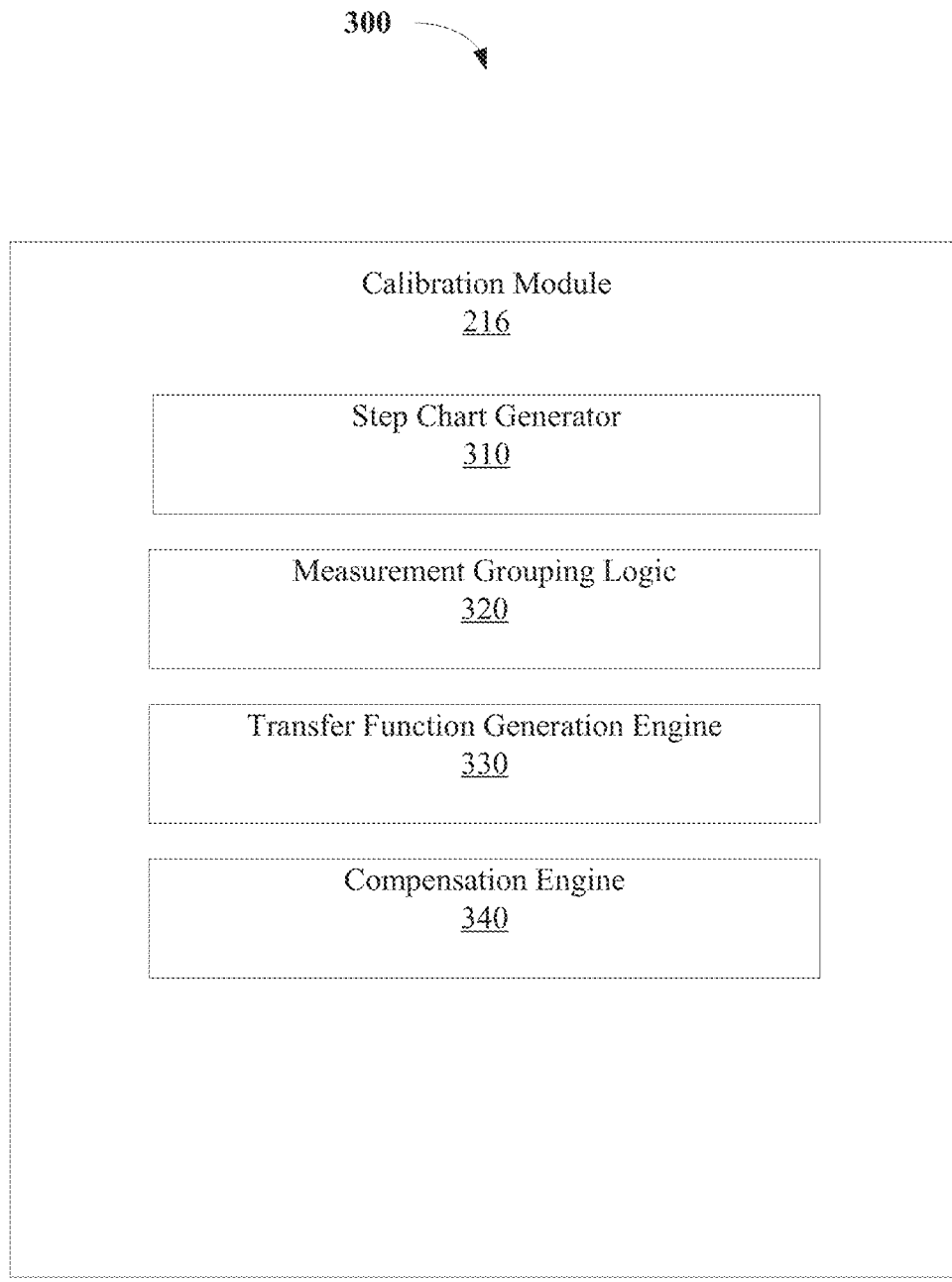
FIG. 3 illustrates one embodiment of calibration module.

FIG. 3 illustrates one embodiment of calibration module 216. As shown in FIG. 3, calibration module 216 includes a step chart generator 310 implemented to print a step chart (e.g., calibration step chart). In one embodiment, this chart is printed using the uncalibrated halftone 218.

In one embodiment, the calibration step chart is printed by the pel forming elements 165 of printer 160, and an image of the printed calibration step chart is measured by measurement module 190 (e.g., via a scanner). In such an embodiment, measurement module 190 generates measurement data 222 (e.g., print image measurement data), which includes OD data measured for a uniform grid across the web of the print medium for each pel forming element 165 (or OD measurement data). To obtain properly registered uniform grid data, the measured data is interpolated and using fiducial markings on test charts that are at known locations relative to the pel forming elements 165, registration data is obtained corresponding to each pel forming element 165.

The calibration step chart (e.g., test print image) typically includes a number of steps (e.g., bars or stripes) of uniform color for each of a plurality of colors. The stripe contone levels range from paper white (zero digital count, no ink) to maximum digital count (level 255) for each ink color. Intermediate levels (e.g., 18 between 0-255) are included to allow interpolation to accurately recover the average measured optical density corresponding to each color value by interpolation. The steps are arranged so that every segment or portion of the print head prints each color and digital count level for each color at some point in the chart pattern. Enough pixels are included in the height of each bar so that the random variations in the halftone design are reduced by averaging measured optical densities over the bar height. In one embodiment, the average of the pixel rows in a given bar constitutes a complete sample of the halftone design's threshold array for the level of the given bar, and there is no sampling noise included in the measurement due to halftoning of the step chart before printing.

Figure 4A:
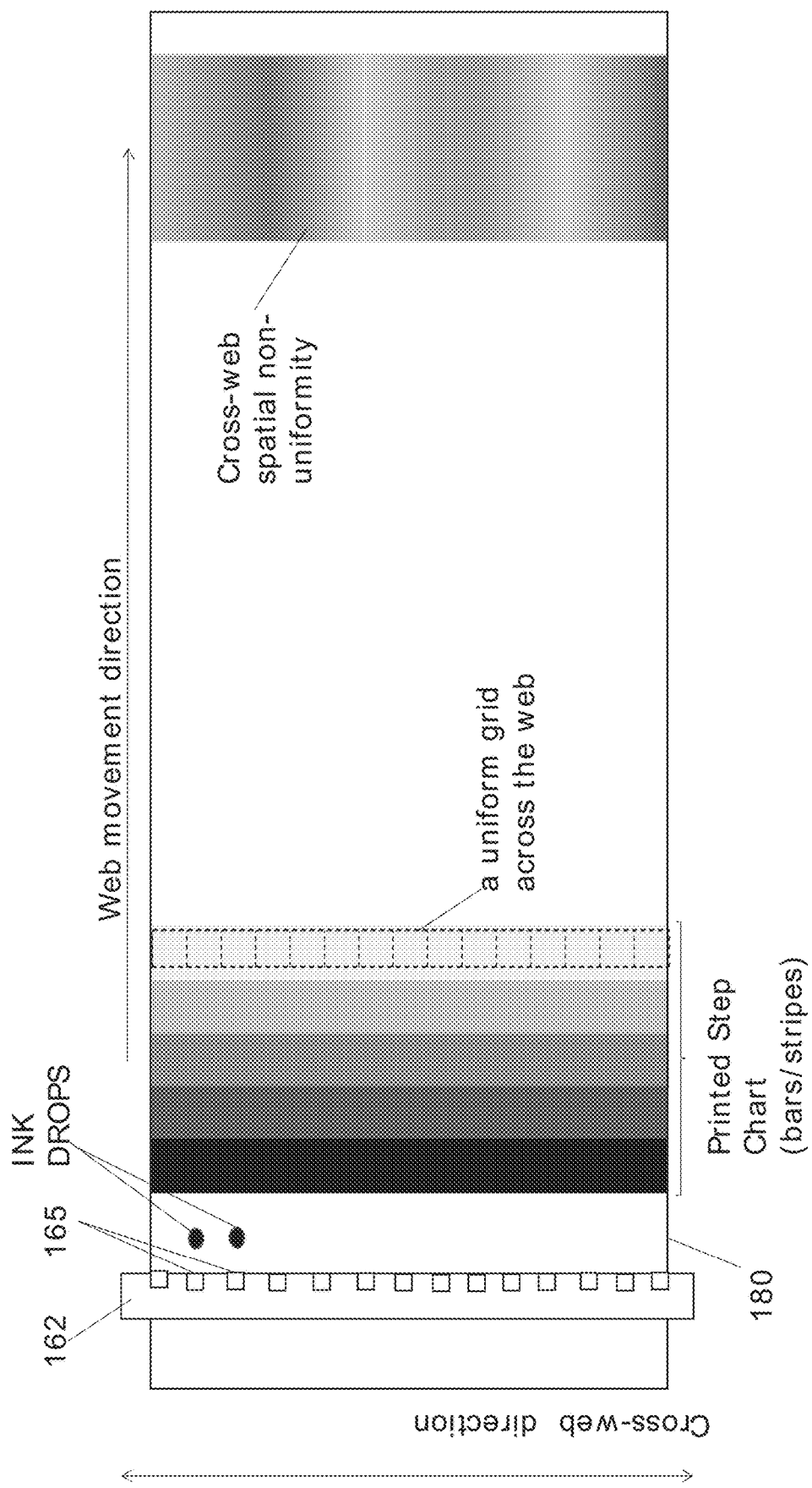
FIG. 4A illustrates one embodiment of a calibration step chart.

FIG. 4A illustrates one embodiment of a calibration step chart. As shown in FIG. 4A, pel forming elements 165 of a printhead 162 prints uniform bars/stripes in a uniform grid across print medium 180. A cross-web spatial non-uniformity is also shown on print medium 180.

In one embodiment, the step charts comprise Cyan, Magenta, Yellow, Red, Green, Blue (CMYRGB) printed for each of the primary colors (e.g., CMY) and secondary colors (e.g., RGB), where a secondary color is a defined mixture of two primary colors. Though blacK is a primary color for a CMYK printer, blacK does not need to be included in the step chart. In another embodiment, the step charts also include primary color fiducial marks that are implemented to track color plane registration of pel forming elements 165.

Figure 4B:
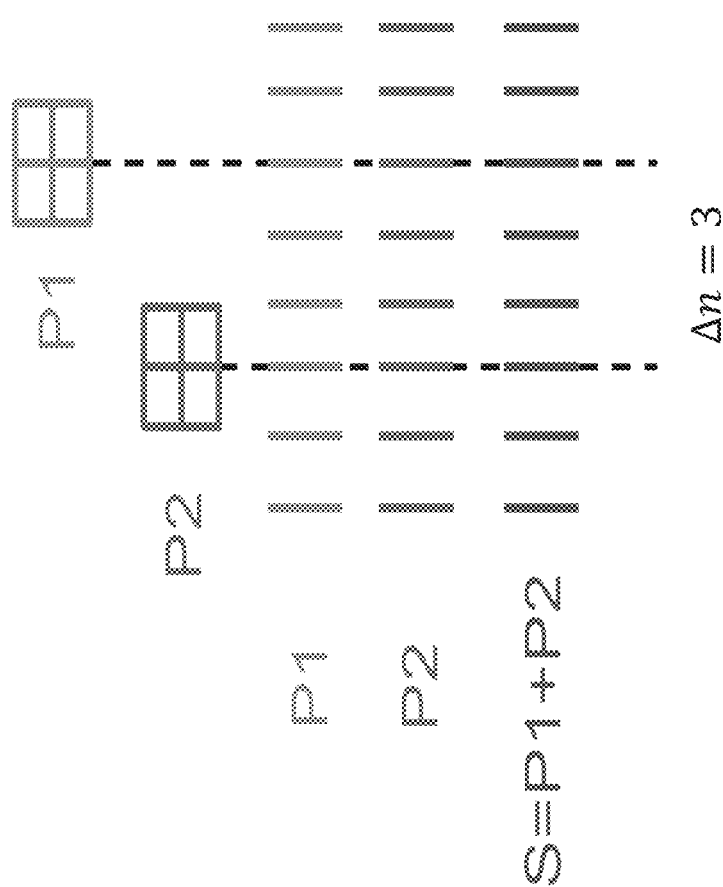
FIG. 4B illustrates one embodiment of primary fiducial color marks.

FIG. 4B illustrates one embodiment of primary fiducial color marks P1 and P2. In one embodiment, horizontal displacement between colors (e.g., horizontal gaps) are used to track pel forming element 165 (or nozzle) location for each color plane. In such an embodiment, the P1 fiducial printed with a first primary color is used to define the P1 and S reference nozzles, while the P2 reference nozzles printed with a second primary color are positionally defined relative to the first primary color positions using a Δn nozzle displacement. The S row shows the combined printing of the two primary colors used to print P1 and P2 creating a mark produced in the secondary color associated with the two primary colors.

In a further embodiment, the fiducial position of P1 may be represented as $n_{p1}$, while the fiducial position of P2 may be represented as $n_{p2}$, where the mean integer displacement of $\Delta n = n_{p1} - n_{p2}$ represents an average displacement across pages. Measurement module 190 measures the color plane fiducial marks to generate color plane displacement data. In one embodiment, the color plane displacement data and the OD measurement data comprise the measurement data 222 that is transmitted to calibration module 216.

Referring back to FIG. 3, calibration module 216 also includes measurement grouping logic 320. In one embodiment, measurement grouping logic 320 receives and groups the measurement data 222 into three subsets corresponding to one primary color P and two secondary colors $S_1$ and $S_2$ (e.g., $\{PS_1S_2\}$), where $S_1$ and $S_2$ are the two secondary colors having primary color P as one of its primary colors components. For example, the three subsets comprise $\{\{CBG\}, \{MBR\}, \{YGR\}\}$. Every individual secondary color RGB will appear twice in this set of three subsets. The respective subsets are numbered such that subset one is $\{CBG\}$, subset two is $\{MBR\}$, and subset three is $\{YGR\}$. In a further embodiment, each secondary color in a subset has a corresponding nozzle displacement $S_{1,2}$ for the primary color in the subset.

Transfer function generation engine 330 (FIG. 3) is also included in calibration module 216. For each subset, transfer function generation engine 330 generates a transfer function associated with each of the pel forming elements 165 based on the measurement data 222 for the color combination in a subset, and the target T(c) 223 (e.g., target function) such that:

$$DC\_out(N) = TF\_X_i(N, DC\_in) = M^{-1}\_X_i(N, T\_X_i(DC\_in)),$$

where X is a single color in a subset (e.g., primary and two secondary colors $\{PS_1S_2\}$ X=P, X=$S_1$ or X=$S_2$ with corresponding nozzle displacement if X=$S_1$, $S_2$) and i represents the current subset (e.g., 1, 2 or 3). Where N is the number of the pel forming element 165 (e.g., nozzle). DC_in and DC_out are the Digital Count Values. T_$X_i$ is the target response desired when uniformity compensation is applied for color X from subset i. $M^{-1}\_X_i$ is the inverse of the measured response for color X from subset i. Where the measured response M_$X_i$ is based on a chart corresponding to the primary or secondary color X from the subset i. Evaluating this equation for each subset and each pel forming element produces a set of three transfer functions.

In one embodiment, transfer function generation engine 330 first generates the transfer functions (e.g., for each pel forming element 165) for the first primary color in each subset, resulting in an output TF_P, where P=$\{C, M, Y\}$. For each of the two secondary colors in the subset, transfer function generation engine 330 uses the corresponding color plane displacement data to match to the correct pel forming elements 165 of the primary color when computing the transfer function matrix, resulting in the outputs TF_$S_1$ and TF_$S_2$, where $S_{1,2} = \{R, G, B\}$. The transfer function matrix is comprised of the DC_out values for all possible digital count levels stored in rows of the matrix and columns containing the individual transfer functions for each pel forming element 165. A total of three matrices for each subset are generated. Alternatively, the individual transfer functions for each pel forming element may be in the form of a set of transfer functions (e.g., a second set of transfer functions) and processed in an equivalent manner as the transfer function matrix is in the following steps.

In one embodiment, a transfer function comprises a mapping of an input digital count (DC_in) to an output digital count (DC_out) for a system, where digital count is the gray level or color value representing the pels in a bitmap 150 (FIG. 1). Transfer functions may be generated based on target OD versus input digital count data, measured OD versus output digital count data and target T(c). In one embodiment, the color values are the Digital Count (DC) levels, which may be 0 to 255, for a typical 8-bit printing system.

Figure 5:
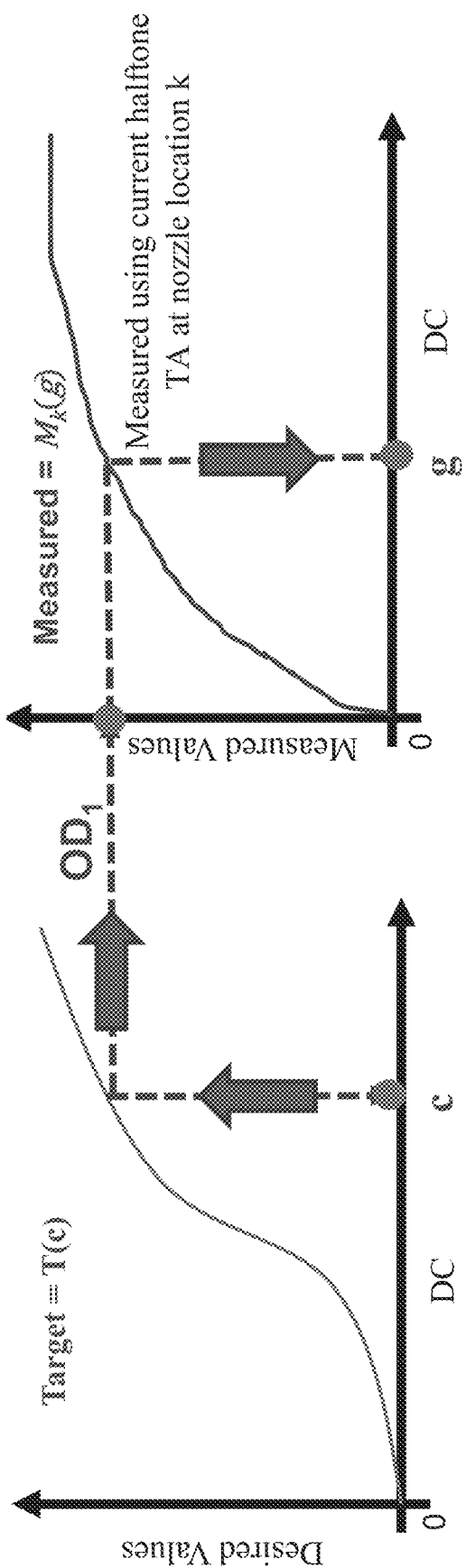
FIG. 5 illustrates one embodiment of a transfer function for a nozzle location.

FIG. 5 illustrates one embodiment of a transfer function of a pel forming element 165 (or nozzle) formed by the set of (c, g) tuples for all digital count levels. The measured response for nozzle position k (pel element number) is given by $M_k(g)$. The measured response is determined by printing color X. The target is the desired response for the color X. Where X is a primary or secondary color as described previously. The value $M_k(g)$ is the measured OD of the printed output at the cross print medium (e.g., web) location corresponding to nozzle k and the current uncalibrated halftone (e.g., threshold array).

As shown in FIG. 5, the Transfer Function is TF(c)=g. In one embodiment, the transfer function of color value c is a color value g that, when color value g is printed by the print system, causes the target optical density at color value c to be obtained as the measured value. $TF_k(c)$ may be determined as shown in FIG. 5 by following the dotted line path in the direction of the indicated arrows. This is because c and g both have the same Optical Density $OD_1$ associated with them, with color c occurring in the target domain and color g in the measured domain systems. Hence applying the respective transfer functions to image data for each pel forming element k will produce the desired target response T (e.g., T(c)) producing uniformity for all pel forming elements so as to satisfy the objective of uniformity compensation.

The output TF(c) may be derived from T(c) and $M_k(g)$ by tabulating the matching color pair tuples for optical densities as explained here for colors c and g. Alternately the target and measured functions can be treated as continuous functions with the transfer function $TF_k(c)$ and $TF_k^{-1}(g)$ derived from the continuous function relationships, previously provided. Where $TF_k(c)$ is the forward application of the transfer function for pel forming element k and $TF_k^{-1}(g)$ is the mathematical inverse relationship for pel forming element k derived from $TF_k(c)$. The target T(c) 223 and measured response $M_k(g)$ may correspond to the same color as the color of nozzle k (e.g., one of a plurality of primary colors). In the case of secondary colors, the target and measured responses are produced from superimposed ink from two primary color pel forming elements. The target response for secondary colors may be assumed to be the mean response including all pel forming elements employed to produce that secondary color.

Referring back to FIG. 3, compensation engine 340 performs uniformity compensation by modifying the transfer function associated with each pel forming element 165 to generate a uniformity compensated transfer function for each pel forming element 165. According to one embodiment, compensation engine 340 generates a uniformity compensated transfer function for each primary color using an average of the primary and secondary transfer functions in a subset that has been generated at transfer function generation engine 330. As a result, compensation engine 340 generates three new compensated transfer function for the CMY primary colors for each pel forming element 165, such that:

$$TFnew\_P = \tfrac{1}{3}*(TF\_P(DC)+TF\_S_1(DC)+TF\_S_2(DC)),$$
or
$$TFnew\_C = \tfrac{1}{3}*(TF\_C(DC)+TF\_B(DC)+TF\_G(DC));$$
$$TFnew\_M = \tfrac{1}{3}*(TF\_M(DC)+TF\_B(DC)+TF\_R(DC));$$
and
$$TFnew\_Y = \tfrac{1}{3}*(TF\_Y(DC)+TF\_G(DC)+TF\_R(DC))$$

Although shown above as implementing an average transfer function, other embodiments may implement different weighted averages in which either the primary or secondary colors are weighted more heavily.

In an alternative embodiment, a neutral color chart produced using a mixture of CMY may be included and a neutral transfer function (TF_neutral) may be generated for that chart. In this embodiment, the neutral transfer function may also be blended into the revised compensated transfer functions for each primary color (e.g., in a similar average or weighted average manner).

Figure 6:
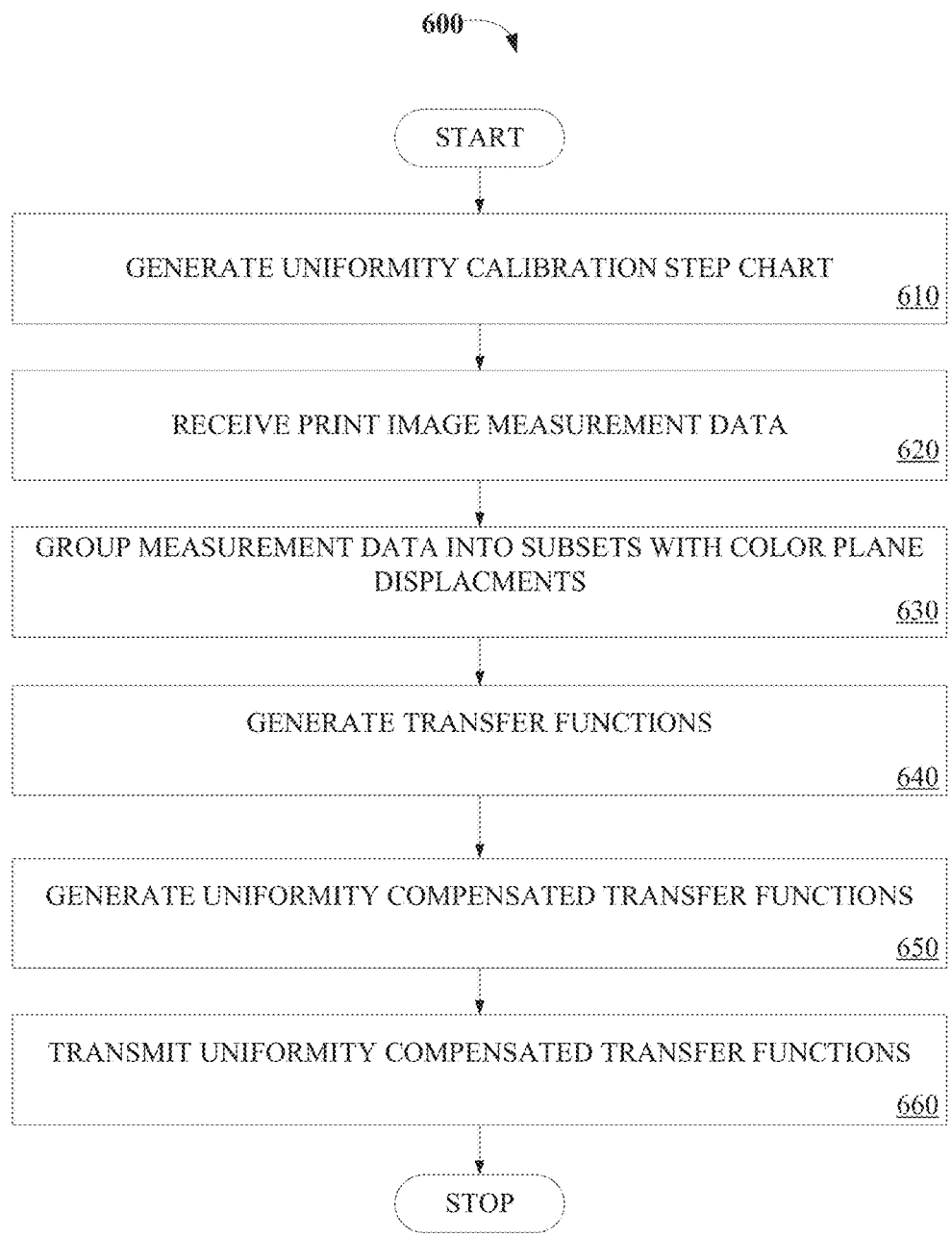
FIG. 6 is a flow diagram illustrating one embodiment of a uniformity compensation process performed by a printing system.

FIG. 6 is a flow diagram illustrating one embodiment of a process 600 for performing uniformity compensation. Process 600 may be performed by processing logic that may include hardware (e.g., circuitry, dedicated logic, programmable logic, microcode, etc.), software such as instructions run on a processing device, or a combination thereof. In one embodiment, process 600 is performed by calibration module 216.

Process 600 begins at processing block 610, where a uniformity calibration step chart is generated. As discussed above the step chart includes CMYRGB steps, as well as primary color fiducial marks used to track color plane displacement. As discussed above, the calibration step chart is printed using an uncalibrated halftone. At processing block 620, the uniformity calibration chart is printed and print image measurement data 222 from measuring the chart, including the OD measurement data and color plane displacement data, is received.

At processing block 630, the measurement data is grouped into the three subsets (e.g., {CBG}, {MBR}, {YGR}) with the corresponding color plane displacement data. At processing block 640, the transfer functions for each pel forming element 165 are generated. As discussed above, the transfer functions for each pel forming element 165 comprises the transfer functions for the primary color in each subset (e.g., TF_P) and a transfer function matrix for the secondary colors (e.g., $TF\_S_1$ and $TF\_S_2$). As mentioned above, the color plane displacement data is implemented to match to the correct pel forming elements 165 of the primary color when computing the transfer function matrix.

At processing block 650, the uniformity compensated transfer functions are generated for each pel forming element 165 based on the transfer functions for the primary color and the transfer function matrix for the secondary colors. At processing block 660, the uniformity compensated transfer functions for each of the pel forming elements 165 are transmitted (e.g., to printer 160).

In one embodiment the final weighted average set of transfer functions for each primary color may be applied to transform the respective image data to achieve uniformity compensation. Transfer functions for each pel forming element are applied to image data corresponding to that pel forming element. In an alternative embodiment, compensation engine 340 may be implemented to generate uniformity compensated halftones. In such an embodiment, transfer function generation engine 330 receives the uniformity compensated transfer functions associated with each pel forming element 165 generated for each primary color (e.g., TFnew_X(N,DC)) (e.g., from compensation engine 340 or an external component) and generates an inverse transfer function (or ITF) for each pel forming element 165 for all DC levels, such that $ITF\_X(N,DC) = TFnew\_X^{-1}(N,DC)$, where N represents a pel forming element 165/column number Compensation engine 340 subsequently receives the ITFs and transforms threshold values in a halftone design threshold array (e.g., an uncalibrated halftone) for each primary color using the associated ITF (e.g., ITF_X(N,DC)) to generate a uniformity compensated threshold array (TAnew_X). In one embodiment, the transformation is performed on a column basis, transforming each set of halftones thresholds for all drop sizes to a compensated set of thresholds for all drop sizes using the corresponding set of ITFs associated with each pel forming element 165 derived by the above-described uniformity compensation process. The columns of uniformity compensated threshold data for each one of the drop sizes in the uncalibrated halftone used when printing using a specific pel forming element correspond to the transfer function derived for the exact same pel forming element.

An inverse transfer function is the mathematical inverse function representation of the transfer function, where the output digital count values of the transfer function form the input digital count values of the inverse transfer function and the input digital count values of the transfer function form the output digital count values of the inverse transfer function. To ensure accuracy, digital count values may be non-integer to describe the inverse transfer function. Threshold values may be converted to integers to generate the calibrated uniformity compensated threshold arrays that match the bit depth of image data.

As shown in FIG. 5, the inverse transfer function of a color value g is the color value c, whose target value T(c) is the measured value $M_k(g)$ that results when the color value g is printed (e.g., ITF(g)=c). T(c) may be set the same for all nozzles to provide uniformity between all nozzles. In one embodiment inverse transfer function ITF(g) may be determined from a mathematical manipulation of TF(c) such as by tabulating the transfer function TF(c) in two columns having all c and g values, and subsequently swapping the columns.

The inverse transfer function may be derived using the data from the swapped columns with a regression or other means (e.g., interpolation) to fit an estimated response function to the data. The fitted function is generated to have strictly monotonic behavior to ensure that the inverse is one to one with a single output value for any input. In another embodiment, inverse transfer function ITF(g) may be determined as shown in FIG. 5 by following the dotted line path in the opposite direction of the indicated arrows based on target function T(c) and measured data $M_k(g)$. The measured response $M_k(g)$ at nozzle location k may be measured with the entire Threshold Array employed for printing, so as to include contributions from adjacent compensated nozzles. Employing scanned image data, the data is interpolated to obtain the measured response for the nozzle at location k.

Figure 7:
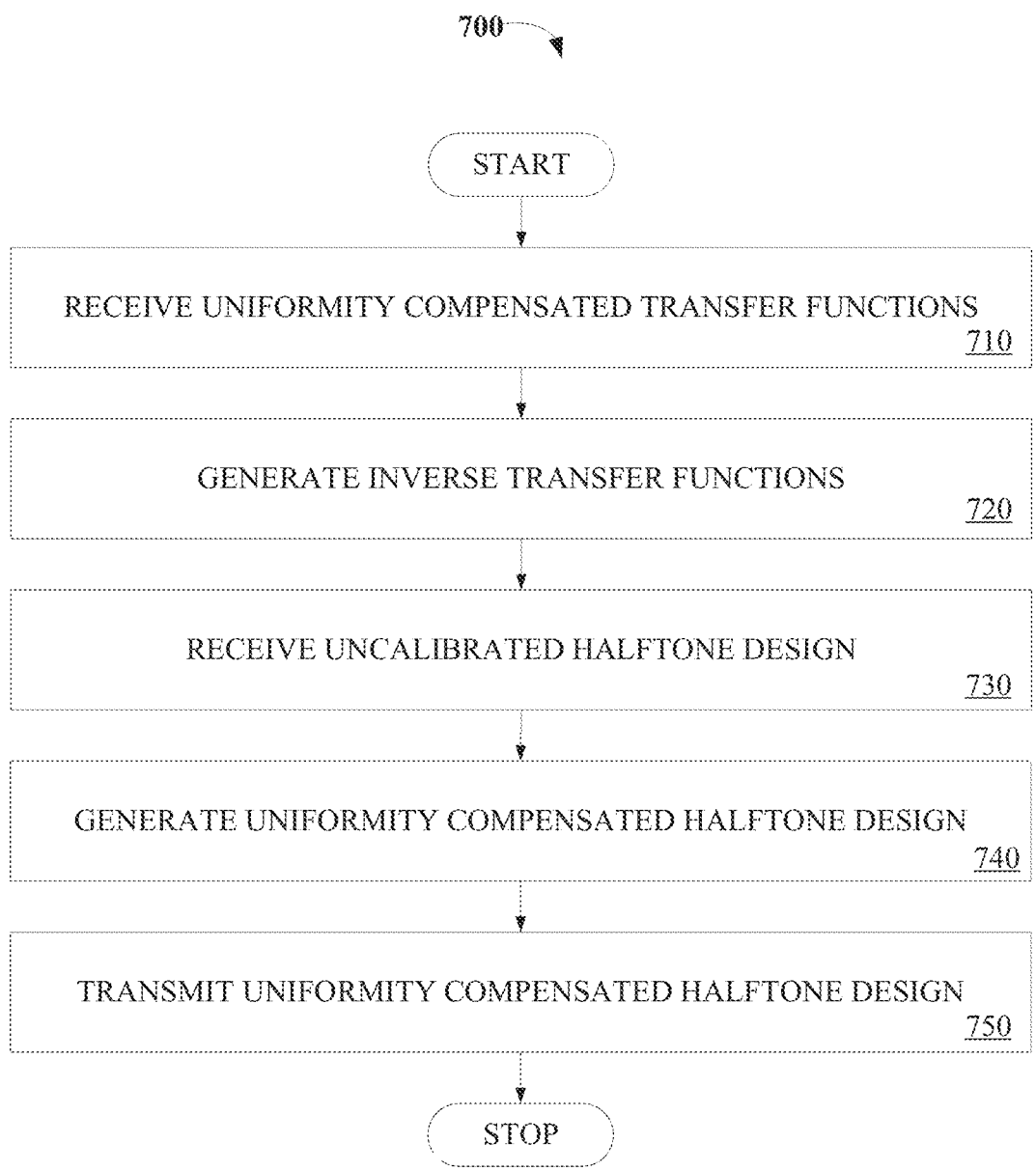
FIG. 7 is a flow diagram illustrating another embodiment of a uniformity compensation process performed by a printing system.

FIG. 7 is a flow diagram illustrating another process 700 for performing uniformity compensation. In this process, uniformity compensated halftones are employed. Process 700 may be performed by processing logic that may include hardware (e.g., circuitry, dedicated logic, programmable logic, microcode, etc.), software such as instructions run on a processing device, or a combination thereof. In one embodiment, process 700 is performed by calibration module 216.

Process 700 begins at processing block 710 where the uniformity compensated transfer functions are received. At processing block 720, inverse transfer functions (e.g., uniformity compensated inverse transfer functions) are generated based on the uniformity compensated transfer functions. In one embodiment, inverse transfer functions may be generated as explained earlier. At processing block 730, an uncalibrated halftone design is received. At processing block 740, a uniformity compensated halftone design is generated based on the uncalibrated halftone design and the inverse transfer functions. As discussed above, the uniformity compensated halftone design is generated by modifying the thresholds in each column of a threshold array using the inverse transfer function for each pel forming element 165. At processing block 750, the uniformity compensated halftone design is transmitted.

Figure 8:
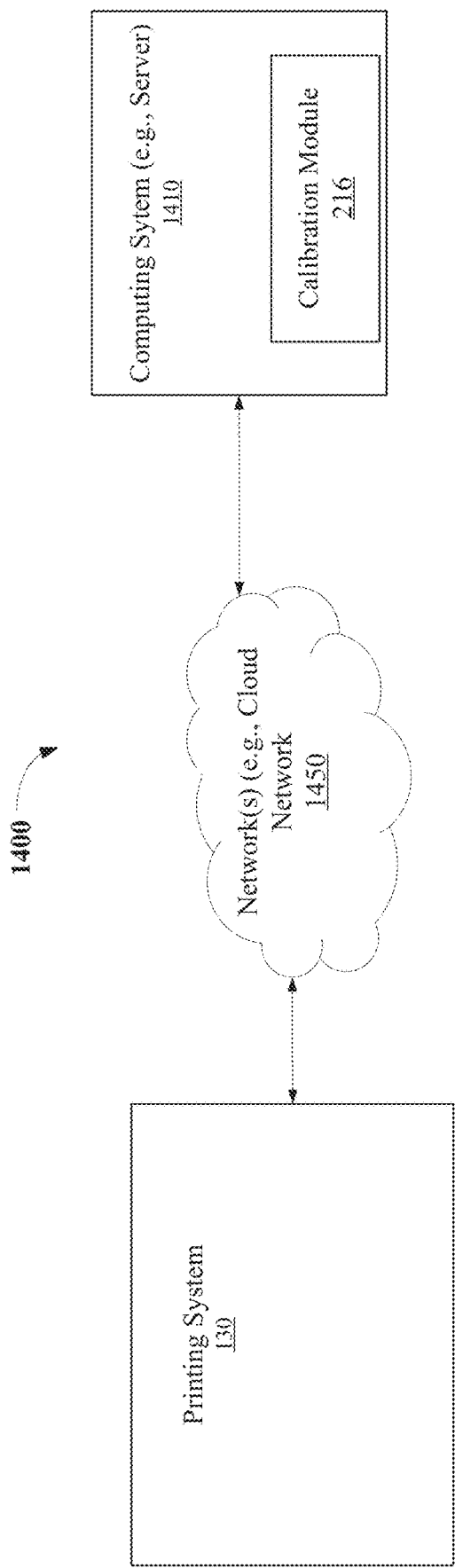
FIG. 8 illustrates one embodiment of a calibration module implemented in a network.

Although shown as a component of print controller 140, other embodiments may feature calibration module 216 included within an independent device, or combination of devices, communicably coupled to print controller 140. For instance, FIG. 8 illustrates one embodiment of a calibration module 216 implemented in a network 1400. As shown in FIG. 8, calibration module 216 is included within a computing system 1410 and transmits calibrated halftones and/or calibrated transfer functions to printing system 130 via a cloud network 1450. Printing system 130 receives calibrated halftones and/or calibrated transfer functions to be applied in the printing process.

Figure 9:
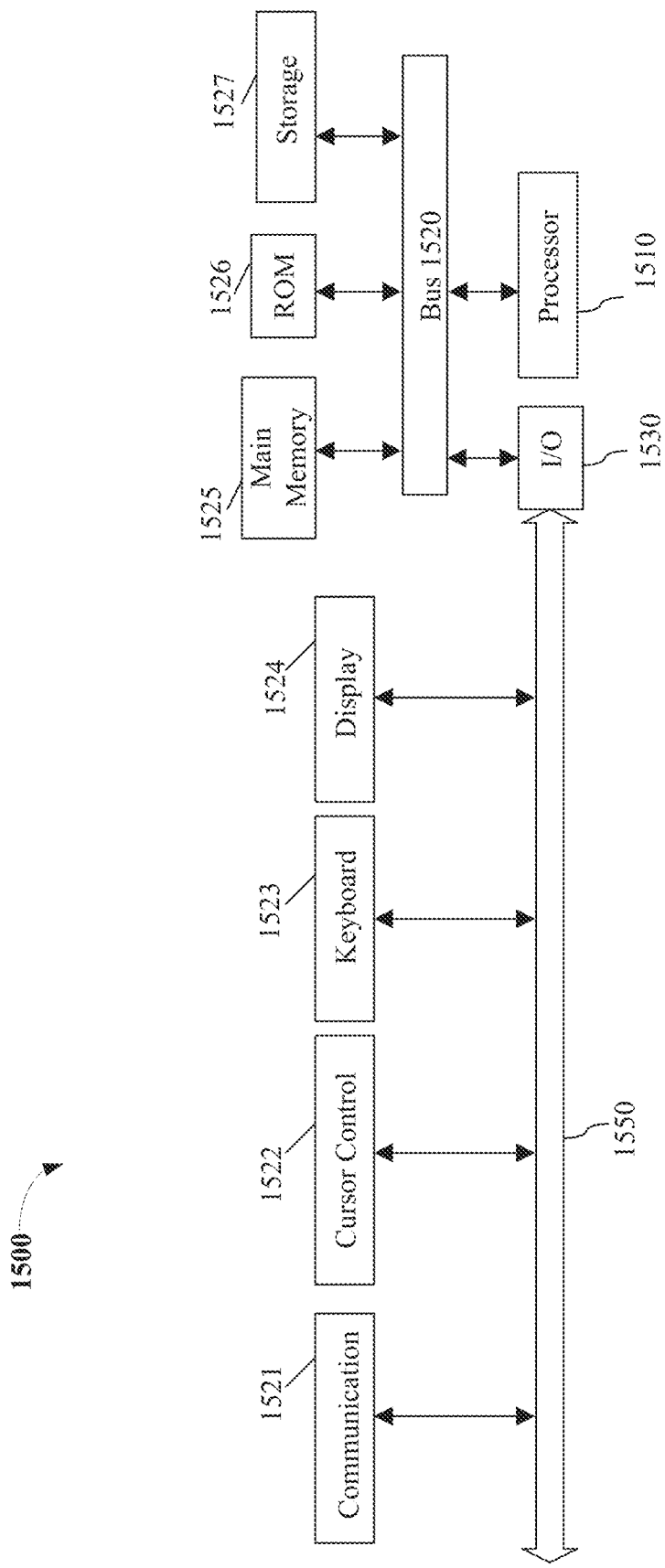
FIG. 9 illustrates one embodiment of a computer system.

FIG. 9 illustrates a computer system 1500 on which printing system 130 and/or calibration module 216 may be implemented. Computer system 1500 includes a system bus 1520 for communicating information, and a processor 1510 coupled to bus 1520 for processing information.

Computer system 1500 further comprises a random access memory (RAM) or other dynamic storage device 1525 (referred to herein as main memory), coupled to bus 1520 for storing information and instructions to be executed by processor 1510. Main memory 1525 also may be used for storing temporary variables or other intermediate information during execution of instructions by processor 1510.

Computer system 1500 also may include a read only memory (ROM) and or other static storage device 1526 coupled to bus 1520 for storing static information and instructions used by processor 1510.

A data storage device 1527 such as a magnetic disk or optical disc and its corresponding drive may also be coupled to computer system 1500 for storing information and instructions. Computer system 1500 can also be coupled to a second I/O bus 1550 via an I/O interface 1530. A plurality of I/O devices may be coupled to I/O bus 1550, including a display device 1524, an input device (e.g., an alphanumeric input device 1523 and or a cursor control device 1522). The communication device 1521 is for accessing other computers (servers or clients). The communication device 1521 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising at least one physical memory device to store calibration logic and one or more processors coupled with the at least one physical memory device to execute the calibration logic to perform uniformity compensation, including receiving print image measurement data corresponding to primary color markings and secondary color markings printed by pel forming elements, wherein each of the pel forming elements is associated with one of a plurality of primary colors, generating a first set of transfer functions, wherein the first set of transfer functions includes a transfer function for each of the pel forming elements associated with a primary color, generating a second set of transfer functions, wherein the second set of transfer functions includes transfer functions for each of the pel forming elements associated with a plurality of secondary colors and generating a set of uniformity compensated transfer functions, wherein the set of uniformity compensated transfer functions includes a transfer function for each of the pel forming elements based on the first set of transfer functions and the corresponding second set of transfer functions.

Example 2 includes the subject matter of Example 1, wherein the uniformity compensated transfer functions are generated based on an average of the first set of transfer functions and the second set of transfer functions.

Example 3 includes the subject matter of Examples 1 and 2, wherein the calibration logic groups the print image measurement data into a plurality of subsets that comprises the primary color and the plurality of secondary colors.

Example 4 includes the subject matter of Examples 1-3, wherein the print image measurement data comprises color plane displacement data.

Example 5 includes the subject matter of Examples 1-4, wherein generating the second set of transfer functions comprises using the color plane displacement data to match the plurality of secondary colors in a subset to pel forming elements associated with the primary color in the subset.

Example 6 includes the subject matter of Examples 1-5, wherein the calibration logic further transmits the uniformity compensated transfer functions.

Example 7 includes the subject matter of Examples 1-6, further comprising a print engine to receive the uniformity compensated transfer functions and print the print image measurement data by applying the uniformity compensated transfer functions.

Some embodiments pertain to Example 8 that includes a method comprising receiving print image measurement data corresponding to primary color markings and secondary color markings printed by pel forming elements, wherein each of the pel forming elements is associated with one of a plurality of primary colors, generating a first set of transfer functions, wherein the first set of transfer functions includes a transfer function for each of the pel forming elements associated with a primary color, generating a second set of transfer functions, wherein the second set of transfer functions includes transfer functions for each of the pel forming elements associated with a plurality of secondary colors and generating a set of uniformity compensated transfer functions, wherein the set of uniformity compensated transfer functions includes a transfer function for each of the pel forming elements based on the first set of transfer functions and the corresponding second set of transfer functions.

Example 9 includes the subject matter of Example 8, wherein the uniformity compensated transfer functions are generated based on an average of the first set of transfer functions and the second set of transfer functions.

Example 10 includes the subject matter of Examples 8 and 9, further comprising grouping the print image measurement data into a plurality of subsets.

Example 11 includes the subject matter of Examples 8-10, wherein the plurality of subsets that comprises the primary color and the plurality of secondary colors.

Example 12 includes the subject matter of Examples 8-11, wherein the print image measurement data comprises color plane displacement data.

Example 13 includes the subject matter of Examples 8-12, wherein generating the second set of transfer functions comprises using the color plane displacement data to match the plurality of secondary colors in a subset to pel forming elements associated with the primary color in the subset.

Example 14 includes the subject matter of Examples 8-13, further comprises transmitting the uniformity compensated transfer functions.

Some embodiments pertain to Example 15 that includes at least one computer readable medium having instructions stored thereon, which when executed by one or more processors, cause the processors to receive print image measurement data corresponding to primary color markings and secondary color markings printed by pel forming elements, wherein each of the pel forming elements is associated with one of a plurality of primary colors, generate a first set of transfer functions, wherein the first set of transfer functions includes a transfer function for each of the pel forming elements associated with a primary color, generate a second set of transfer functions, wherein the second set of transfer functions includes transfer functions for each of the pel forming elements associated with a plurality of secondary colors and generate a set of uniformity compensated transfer functions, wherein the set of uniformity compensated transfer functions includes a transfer function for each of the pel forming elements based on the first set of transfer functions and the corresponding second set of transfer functions.

Example 16 includes the subject matter of Example 15, wherein the uniformity compensated transfer functions are generated based on an average of the first set of transfer functions and the second set of transfer functions.

Example 17 includes the subject matter of Examples 15 and 16, having instructions stored thereon, which when executed by one or more processors, further cause the processors to group the print image measurement data into a plurality of subsets that comprises the primary color and the plurality of secondary colors.

Example 18 includes the subject matter of Examples 15-17, wherein the print image measurement data comprises color plane displacement data.

Example 19 includes the subject matter of Examples 15-18, wherein generating the second set of transfer functions comprises using the color plane displacement data to match the plurality of secondary colors in a subset to pel forming elements associated with the primary color in the subset.

Example 20 includes the subject matter of Examples 15-19, having instructions stored thereon, which when executed by one or more processors, further cause the processors to transmit the uniformity compensated transfer functions.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
   at least one physical memory device to store calibration logic; and
   one or more processors coupled with the at least one physical memory device to execute the calibration logic to perform uniformity compensation, including:
      receiving print image measurement data corresponding to primary color markings and secondary color markings printed by pel forming elements, wherein each of the pel forming elements is associated with one of a plurality of primary colors;

generating a first set of transfer functions, wherein the first set of transfer functions includes a transfer function for each of the pel forming elements associated with a primary color;

generating a second set of transfer functions, wherein the second set of transfer functions includes transfer functions for each of the pel forming elements associated with a plurality of secondary colors; and generating a set of uniformity compensated transfer functions, wherein the set of uniformity compensated transfer functions include a transfer function for each of the pel forming elements based on the first set of transfer functions and the corresponding second set of transfer functions.

2. The system of claim 1, wherein the uniformity compensated transfer functions are generated based on an average of the first set of transfer functions and the second set of transfer functions.

3. The system of claim 1, wherein the calibration logic groups the print image measurement data into a plurality of subsets that comprises the primary color and the plurality of secondary colors.

4. The system of claim 3, wherein the print image measurement data comprises color plane displacement data.

5. The system of claim 4, wherein generating the second set of transfer functions comprises using the color plane displacement data to match the plurality of secondary colors in a subset to pel forming elements associated with the primary color in the subset.

6. The system of claim 1, wherein the calibration logic further transmits the uniformity compensated transfer functions.

7. The system of claim 1, further comprising a print engine to receive the uniformity compensated transfer functions and print the print image measurement data by applying the uniformity compensated transfer functions.

8. A method comprising:

receiving print image measurement data corresponding to primary color markings and secondary color markings printed by pel forming elements, wherein each of the pel forming elements is associated with one of a plurality of primary colors;

generating a first set of transfer functions, wherein the first set of transfer functions includes a transfer function for each of the pel forming elements associated with a primary color;

generating a second set of transfer functions, wherein the second set of transfer functions includes transfer functions for each of the pel forming elements associated with a plurality of secondary colors; and generating a set of uniformity compensated transfer functions, wherein the set of uniformity compensated transfer functions includes a transfer function for each of the pel forming elements based on the first set of transfer functions and the corresponding second set of transfer functions.

9. The method of claim 8, wherein the uniformity compensated transfer functions are generated based on an average of the first set of transfer functions and the second set of transfer functions.

10. The method of claim 8, further comprising grouping the print image measurement data into a plurality of subsets.

11. The method of claim 10, wherein the plurality of subsets that comprises the primary color and the plurality of secondary colors.

12. The method of claim 10, wherein the print image measurement data comprises color plane displacement data.

13. The method of claim 12, wherein generating the second set of transfer functions comprises using the color plane displacement data to match the plurality of secondary colors in a subset to pel forming elements associated with the primary color in the subset.

14. The method of claim 8, further comprises transmitting the uniformity compensated transfer functions.

15. At least one non-transitory computer readable medium having instructions stored thereon, which when executed by one or more processors, cause the processors to:

receive print image measurement data corresponding to primary color markings and secondary color markings printed by pel forming elements, wherein each of the pel forming elements is associated with one of a plurality of primary colors;

generate a first set of transfer functions, wherein the first set of transfer functions includes a transfer function for each of the pel forming elements associated with a primary color;

generate a second set of transfer functions, wherein the second set of transfer functions includes transfer functions for each of the pel forming elements associated with a plurality of secondary colors; and generate a set of uniformity compensated transfer functions, wherein the set of uniformity compensated transfer functions includes a transfer function for each of the pel forming elements based on the first set of transfer functions and the corresponding second set of transfer functions.

16. The non-transitory computer readable medium of claim 15, wherein the uniformity compensated transfer functions are generated based on an average of the first set of transfer functions and the second set of transfer functions.

17. The non-transitory computer readable medium of claim 16, having instructions stored thereon, which when executed by one or more processors, further cause the processors to group the print image measurement data into a plurality of subsets that comprises the primary color and the plurality of secondary colors.

18. The non-transitory computer readable medium of claim 17, wherein the print image measurement data comprises color plane displacement data.

19. The non-transitory computer readable medium of claim 18, wherein generating the second set of transfer functions comprises using the color plane displacement data to match the plurality of secondary colors in a subset to pel forming elements associated with the primary color in the subset.

20. The non-transitory computer readable medium of claim 19, having instructions stored thereon, which when executed by one or more processors, further cause the processors to transmit the uniformity compensated transfer functions.

* * * * *